Figure 1:
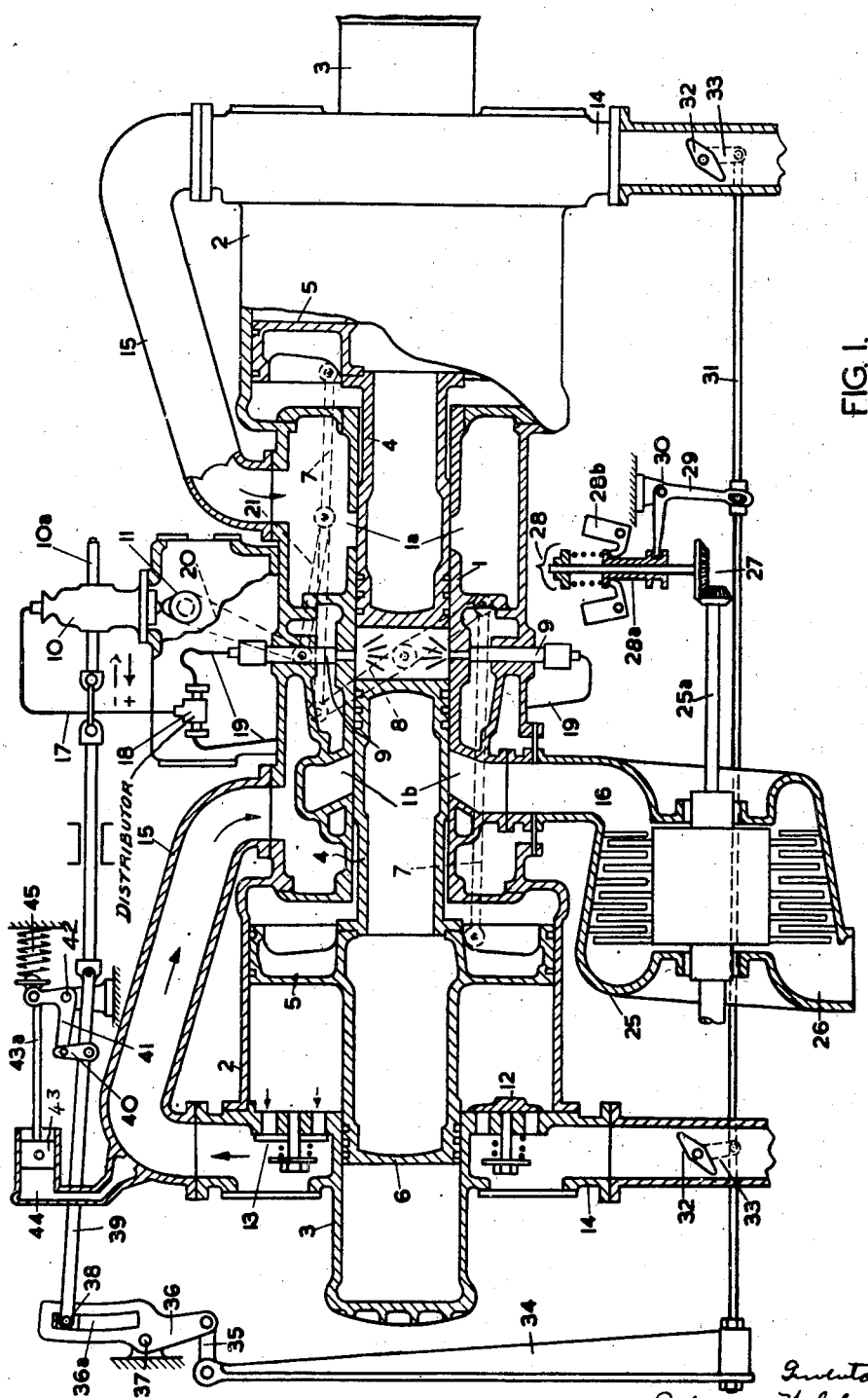

April 19, 1949. R. J. WELSH 2,467,513
GOVERNING OF FREE PISTON COMPRESSORS
Filed Aug. 1, 1944 2 Sheets-Sheet 1

Inventor:
Robert J. Welsh
by Babcock & Bobcsik
Attorneys

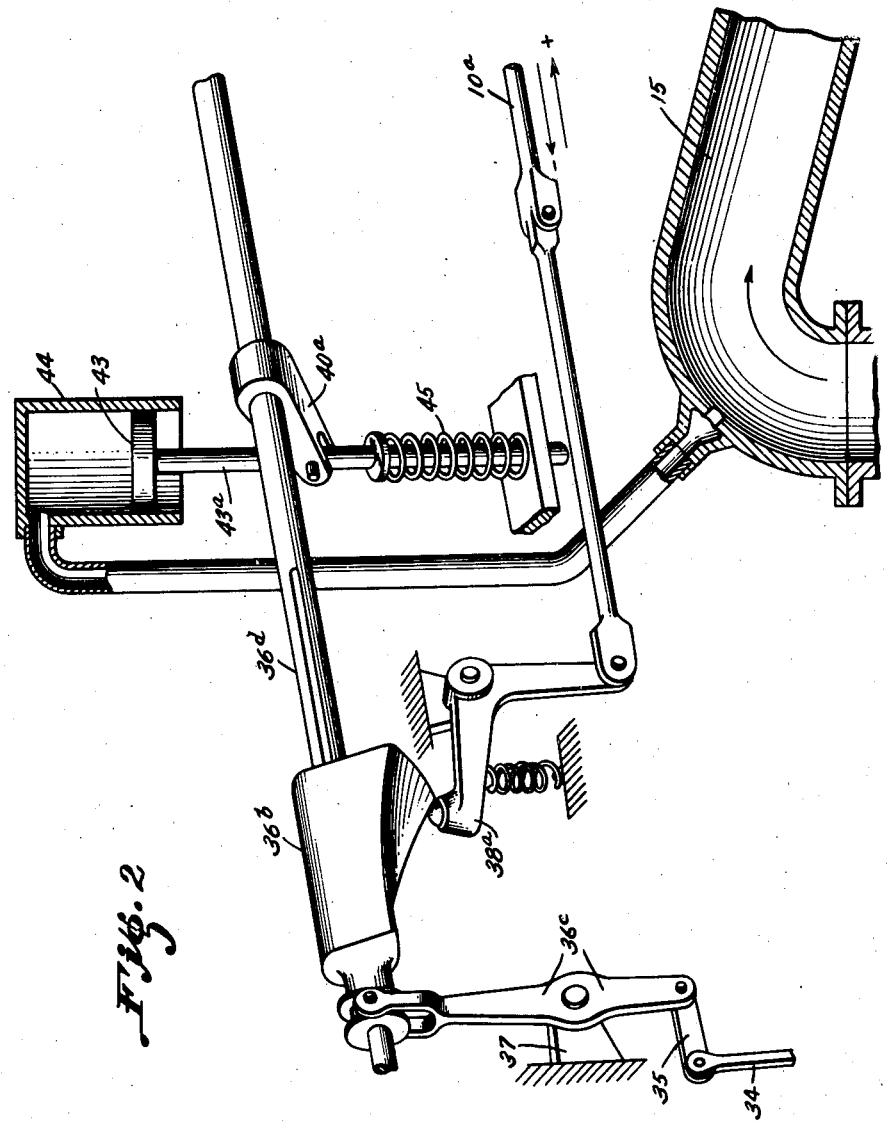

Patented Apr. 19, 1949

2,467,513

UNITED STATES PATENT OFFICE 2,467,513

GOVERNING OF FREE PISTON COMPRESSORS

Robert James Welsh, Rugby, England, assignor to The English Electric Company Limited, London, England, a British company Application August 1, 1944, Serial No. 547,592
In Great Britain March 13, 1943

Section 1, Public Law 690, August 8, 1946
Patent expires March 13, 1963

4 Claims. (Cl. 60—13)

This invention relates to a free piston type internal combustion compressor—i. e. a device wherein a compressor piston is directly connected to or combined with an internal combustion engine piston instead of being driven thereby through connecting rods, cranks and crankshafts. There are usually two opposed engine pistons reciprocable towards and away from each other in one cylinder; the engine is usually one operating on a two-stroke compression-ignition cycle, some or all of the air from the compressor serving to scavenge and charge the engine cylinder.

If a free piston type of internal combustion compressor be used as a gas generator to supply motive fluid to a prime mover (hereinafter referred to as a turbine since it will usually take that form), some arrangement is necessary for controlling the output of the compressor in accordance with the load imposed on the turbine in order to prevent excessive speed fluctuations of the latter or alternatively in some cases such as when the turbine is coupled to a ship's propeller the output of the compressor may require to be regulated in order that the turbine may run at various chosen speeds; since such an arrangement will usually consist of or include some form of speed governor driven by the turbine it will hereinafter be given the comprehensive term "turbine governor."

According to the present invention the fuel supply to the engine cylinder of the gas generator is under the joint control of the governor and of means responsive to the pressure of the gas delivered by the gas generator or of the air delivered by the compressor part thereof. According to a further feature, the turbine governor controls means—such as for example a throttle valve in the inlet to the compressor or means controlling such a valve— for regulating the volumetric efficiency of the compresosr and also regulates the fuel supply; the arrangement is such that an increase in the said delivery pressure increases the fuel supply and the higher the delivery pressure the greater is the increase in the fuel supply corresponding to a given change in volumetric' efficiency in response to the action of the governor. According to yet another feature the internal combustion compressor device has both a volumetric efficiency regulator, as mentioned above, and a fuel regulator, both controlled by the speed governor actuated by the prime mover; means responsive to the said delivery pressure act on a variable-ratio operative connection between the two said regulators in such a sense that the higher the delivery pressure the greater is the movement of the fuel regulator corresponding to a given movement of the other regulator. According to an important feature of the invention, these various control devices co-operate to maintain the point reached by the free piston at the end of the expansion stroke of the engine, which point may conveniently be called the outer dead centre, substantially constant under all operating conditions.

One complete plant according to the invention is shown, with the free-piston gas-generator in axial cross-section, in Fig. 1 of the accompanying drawings, and a part view of another modification is shown in Figure 2.

In Fig. 1 the body of the free-piston type internal-combustion compressor comprises the engine cylinder 1, the pair of compressor cylinders 2 at opposite ends thereof and the pair of buffer cylinders 3 at the extreme outer ends. Within the engine cylinder 1 reciprocate the opposed engine pistons 4, each of which forms a free piston unit with one of the compressor pistons 5 reciprocating in the cylinders 2 and one of the buffer pistons 6 reciprocating in the cylinders 3. The head of each of the compressor cylinders 2 is provided with at least one inlet valve 12 of conventional form—i. e. a valve which opens only when the pressure inside the cylinder falls below a predetermined value—and at least one discharge valve 13 of conventional form—i. e. a valve which opens only when the pressure inside the cylinder exceeds a predetermined maximum. The valves 12 put each of the compressor cylinders 2 in communication with an inlet conduit 14 while the valves 13 put the compressor cylinders 2 in communication with the conduits 15 communicating with the annular space surrounding the ring of inlet ports 1a in the engine cylinder 1. The latter is provided also with rings of exhaust ports 1b opening into an annular space with which communicates the exhaust conduit 16.

The reciprocating piston units are synchronised in the well-known and usual manner by being linked by the pair of links 7 to opposite ends of the lever 8 having its mid point pivotally supported on the outside part of the engine cylinder 1.

Fuel can be injected into the cylinder 1 by fuel injectors 9 of conventional form supplied in usual manner through fuel pipe 17, the usual form of distributor 18 and the fuel pipes 19 by the fuel injection pump 10 of conventional form reciprocated by cam 11 which is oscillated (in accordance with the movement of the free piston units) by the lever 20 which is connected by link 21 to a point on one of the links 7; the quantity of fuel injected by each stroke of the injection pump 10 is determined in the usual manner by the position of its fuel rack 10a.

The conduit 16 connects the engine exhaust to the inlet to the turbine 25 which exhausts to the exhaust pipe 26. The turbine shaft 25a drives—through gearing 27—a conventional form of centrifugal speed governor 28. The plant so far described is of well-known kind.

In applying the present invention a throttle valve 32 in the air inlet 14 to each compressor cylinder 2 can be opened and closed by lever 33 mechanically connected to the sleeve 28a (actuated by the weights 28b of the governor 28) by the lever 29 pivoted at 30 and the link 31. In addition, the throttle 32 is connected (by the parts 34 and 35 rigid with link 31) to one end of the slotted link 36 swinging about the fixed pivot 37. In the slot 36a is a slider 38 pivoted on one end of a link 39 pivotally connected at the other end to an extension of the fuel rack 10a. The slider 38 can be moved along the slot 36a by the piston 43 (acting through its piston rod 43a, the lever 41 turning about fixed pivot 42 and the connecting link 40) which piston can be moved in cylinder 44 by fluid pressure acting in opposition to the biassing spring 45. The cylinder 44 communicates with one of the conduits 15 so that the pressure in the cylinder 44 is that of the air delivered from compressor cylinder 2 through valve 13.

The manner of operation of the plant is as follows:

When the free-piston units approach the inner dead centre position as shown in Fig. 1, air is compressed in the engine cylinder 1 between the pistons 4 to a temperature at which injected fuel will ignite while the cam 11 operates the fuel pump 10 to inject into this compressed air (through the injection valves 9) a quantity of fuel which is determined by the position of the fuel rack 10a. During the outward stroke of pistons 4 and 5 following on the combustion of this fuel, the pistons 5 compress in the cylinders 2 the air previously drawn in through the inlet valves 12 which now close. When the free piston units come to rest at the end of this outward stroke, one of the pistons 4 uncovers the inlet ports 1a so that the air compressed in the cylinders 2 and discharged through the non-return valves 13 into the conduits 15, goes through these conduits, as shown by the arrows, to the inlet ports 1a, thus scavenging the engine cylinder. The other piston 4 has also uncovered the exhaust ports 1b so that the mixture of combustion products and scavenging air goes by way of conduit 16 to the inlet to the turbine 25 to serve as the motive fluid for this turbine and eventually is discharged by the turbine exhaust 26. The buffer pistons 6 during this outward stroke compress air in the buffer cylinders 3 until the piston units are brought to rest and when scavenging of the engine cylinder takes place the pressure in the buffer cylinders 3 causes the piston units to rebound and return to the inner dead centre position, thereby trapping and compressing in the engine cylinder 1 some of the scavenging air while at the same time the compressor pistons 5 draw into the cylinders 2 a fresh charge of air through the non-return inlet valves 12 from the inlet pipes 14. The operation so far described is well known and is described solely for the sake of completeness.

To control the plant, the turbine governor 28 driven by the turbine shaft 25a will act in response, for example, to a decrease in turbine speed to open the inlet throttle 32. When the latter is partially closed the initial pressure of the air drawn into the compressor cylinder 2 and the volumetric efficiency of the compressor will be below their corresponding values when the inlet throttle 32 is fully open and accordingly for any given quantity of fuel injected per cycle the stroke of each piston assembly 4—5—6 would tend to be greater than with the throttle 32 open because due to the lower initial pressure the energy developed by the combustion of the fuel will be in excess of that which would be absorbed in overcoming the resistance of the pistons when operating over the original length of stroke. Conversely, a re-opening of the inlet throttle 32 will increase the initial pressure and the volumetric efficiency, thus tending to decrease the stroke. Varying the volumetric efficiency of the compressor within practicable limits will not substantially affect—for a given fuel injection—either the mass of air drawn into and delivered by the compressor or its delivery pressure; these are determined principally by the quantity of fuel injected per cycle and by the mass flow/pressure characteristic of the turbine 25.

Hence it follows that on a decrease in turbine speed the initial pressure of the air admitted to and the volumetric efficiency of the compressor are increased and if there were no corresponding change in the fuel supply the stroke of each free piston assembly 4—5—6 would tend to decrease. For any particular value of the delivery pressure in conduit 15 the slotted link 36 will, however, move the link 39 and the fuel rack 10a—on the opening of the inlet throttle 32—to increase the fuel supply to the engine—e. g. the quantity of fuel injected per stroke—to an extent dependent on the said delivery pressure and such as is necessary to maintain a substantially constant outer dead centre position of each free piston assembly 4—5—6. The output of the gas generator will accordingly be increased in accordance with the increased load on the turbine 25 and will thus tend to restore the turbine speed to substantially the correct value. For a higher delivery pressure in conduit 15 the slider 38 will be in such a different position in the slot 36a that for the same movement of the inlet throttle 32 the link 39 and consequently the fuel rack 10a will have a greater movement and will cause a greater increase in the fuel supply. An increase in said delivery pressure will move the slider 38 along the link and thereby move the fuel rack 10a to vary the fuel supply in a manner depending on the position of the inlet throttle 32. For each position of the throttle 32 over the range from fully open to fully closed there is a desired relationship between pressure and fuel supply and the various loci of slider 38 corresponding to each of these relationships can be plotted. The cam slot 36a is so shaped and so positioned relatively to pivot 37 that as the slotted link 36 turns about pivot 37 the cam slot will lie approximately along each of these desired loci in succession.

It will be thus seen that both the volumetric efficiency and the fuel supply are under the control of the governor 28 but by reason of the variable-ratio operative connection between the fuel rack 10a and the inlet throttle 32 (constituted by the slotted link 36, slider 38 and link 39) under the control of piston 43 an increase in delivery pressure increases the movement of the fuel rack corresponding to a given movement of the throttle.

A closer approximation to the desired ratio of the movement of the fuel rack 10a to that of the throttle 32 could obtained as shown in Fig. 2 by making the member 38a (corresponding to member 38 in Fig. 1) a follower engaging a long and axially slidable cylindrical cam 36b which is rocked about its axis by piston 43 and lever 40a as the pressure changes. The link 34 from the governor can move the cam 36b axially by turning lever 36c about fixed pivot 37 through link 35, the parts 36b and 36c together taking the place of link 36 in Figure 1. The contour of the cam so varies along its length that for each position of the throttle 32 over the range from fully open to fully closed the turning of the cam about its axis in accordance with pressure moves the follower 38a to give substantially the correct adjustment to the fuel rack 10a. Or to explain the action in another way, for each different value of pressure the cam will be in a different angular position and a given movement of the governor arms and throttle will impart through the agency of the cam 36b a different movement to the fuel regulator 10a.

What I claim as my invention and desire to secure by Letters Patent is:

1. Control for a power plant comprising a free piston type internal combustion compressor device and a prime mover with its inlet in motive fluid supply connection with said compressor devce, said control comprising a speed governor actuated by the prime mover, a fuel supply regulator adapted to regulate the fuel supply to the said internal combustion compressor device, an adjustable connecting means between said speed governor and said fuel supply regulator adapted for transmitting the movement of the said speed governor at a variable ratio to the movement of said fuel supply regulator in a sense of reducing the fuel supply at increased speed setting of the said speed governor, and a pressure responsive device exposed to the gas delivery pressure of part of said compressor device and operatively connected to the said adjustable connecting means in a sense of increasing said ratio in response to a high gas delivery pressure, and in a sense of reducing said ratio in response to a low gas delivery pressure.

2. Control for a power plant comprising a free piston type internal combustion compressor device and a prime mover with its inlet in motive fluid supply connection with said compressor device, said control comprising a speed governor actuated by the prime mover, a variable throttle in the compressor inlet in operative connection with said speed governor in a sense of reducing the volumetric efficiency of said compressor device upon increase of speed of the prime mover, a fuel supply regulator in operative connection with said speed governor in a sense of reducing the fuel supply to said internal combustion compressor device upon increase of speed of the prime mover, an adjustable connecting means between the said throttle and said fuel supply regulator adapted for transmitting movement between said throttle and said fuel regulator at a variable ratio, and a pressure responsive device exposed to the gas delivery pressure of part of said compressor device, operatively connected to said adjustable connecting means in a sense of increasing said ratio in response to a high gas delivery pressure, and in a sense of reducing said ratio in response to a low gas delivery pressure.

3. Control for a power plant comprising a free piston type internal combustion compressor device and a prime mover with its inlet in motive fluid supply connection with said compressor device, said control comprising a speed governor actuated by the prime mover, a variable throttle in the compressor inlet in a direct operative connection with said speed governor in a sense of reducing the volumetric efficiency of said compressor device upon increase of speed of the prime mover, a fuel supply regulator in indirect operative connection with said speed governor in a sense of reducing the fuel supply to said internal combustion compressor device upon increase of speed of the prime mover, an adjustable connecting means between said throttle and said fuel supply regulator adapted for transmitting movement from said throttle to said fuel supply regulator at a variable ratio, a pressure responsive device exposed to the gas delivery pressure of part of said compressor device operatively connected to said adjustable connecting means in a sense to increase said ratio in response to a high gas delivery pressure, and in a sense to reduce said ratio in response to a low gas delivery pressure, the said throttle being adapted to control the volumetric efficiency of said compressor device depending on the speed setting of the said speed governor, and the said fuel supply regulator being adapted to regulate the fuel supply to the internal combustion compressor device depending both on the speed setting of said speed governor and on the ratio setting of the said adjustable connecting means.

4. Control for a power plant comprising a free piston type internal combustion compressor device and a prime mover with its inlet in motive fluid supply connection with said compressor device, said control comprising a volumetric efficiency regulator, a fuel regulator, a speed governor actuated by the prime mover and controlling both said regulators in a sense of reducing the volumetric efficiency of and the fuel supply to said internal combustion compressor device upon increase of speed of the prime mover, means responsive to the gas delivery pressure of some parts of said compressor device, a swinging slotted link in operative connection with one of said regulators and movable by or under the control of said speed governor, and a slider movable by said pressure-responsive means in said slotted link towards and away from the pivotal point of the link, this slider being operatively connected to the other regulator.

ROBERT JAMES WELSH.

REFERENCES CITED

The following references are of record in the file of this patent:

UNITED STATES PATENTS

| Number | Name | Date |
| --- | --- | --- |
| 2,147,935 | Steiner | Feb. 21, 1939 |
| 2,200,892 | Pescara | May 14, 1940 |